US006729826B2

(12) United States Patent
Brehmer et al.

(10) Patent No.: US 6,729,826 B2
(45) Date of Patent: May 4, 2004

(54) MOBILE RAMP FOR ELEVATING VEHICLES

(76) Inventors: Joey R. Brehmer, 535 Pearl St., Lyons, NE (US) 68038; Jamie C. Brehmer, 1460 County Rd. "Q", Lyons, NE (US) 68038

( * ) Notice: Subject to any disclaimer, the term of this patent is extended or adjusted under 35 U.S.C. 154(b) by 0 days.

(21) Appl. No.: 09/881,157

(22) Filed: Jun. 14, 2001

(65) Prior Publication Data

US 2002/0192061 A1 Dec. 19, 2002

(51) Int. Cl.[7] .................... B60F 5/02
(52) U.S. Cl. .................... 414/430; 254/88
(58) Field of Search .................... 414/430; 280/43.19, 280/43.24; 16/19, 32, 44; 254/88

(56) References Cited

U.S. PATENT DOCUMENTS

| | | | | | |
|---|---|---|---|---|---|
| 1,419,067 | A | * | 6/1922 | McCarthy | |
| 2,613,389 | A | * | 10/1952 | Cramer | 16/44 |
| 2,924,427 | A | * | 2/1960 | Larson | 254/88 |
| 3,121,556 | A | * | 2/1964 | Faulkner | 254/2 |
| 3,350,095 | A | * | 10/1967 | Clasen | 272/70.3 |
| 3,994,474 | A | * | 11/1976 | Finkbeiner | 254/88 |
| 4,166,516 | A | * | 9/1979 | Thurmond, Jr. | 16/19 |
| 5,001,808 | A | * | 3/1991 | Chung | 16/18 CG |
| 5,118,081 | A | * | 6/1992 | Edelman | 254/88 |
| 5,447,406 | A | | 9/1995 | Voss | 414/430 |
| 5,855,359 | A | | 1/1999 | Chipperfield | 254/88 |
| 6,279,199 | B1 | * | 8/2001 | Plate | 16/19 |
| 6,473,935 | B1 | * | 11/2002 | Cherukuri | 16/33 |

* cited by examiner

*Primary Examiner*—James W. Keenan
(74) *Attorney, Agent, or Firm*—Thomte, Mazour & Niebergall; Shane M. Niebergall

(57) ABSTRACT

A mobile ramp having sloped and horizontal platforms is presented for elevating a vehicle from the floor to provide easy access to the underside of the vehicle to service the same. The ramp is provided with wheels that are pivotably mounted to the frame of the ramp so that they can be extended to raise the ramp off the floor for ease of mobility. The wheels are also retractable to allow the ramp to be safely secured to the floor when it is in use. The retractable action of the wheels is mechanically responsive to the weight of a vehicle as it is wheeled on and off of the ramp, providing for a hands-free operation. While it is mobile, the ramp is further designed to be durable and simple to manufacture.

17 Claims, 4 Drawing Sheets

MOBILE RAMP FOR ELEVATING VEHICLES

BACKGROUND OF THE INVENTION

1. Field of the Invention

The present invention relates to ramps for vehicles and more specifically to a mobile ramp for vehicles that can be manually positioned so that a vehicle can be rolled thereon to elevate one or both ends of the vehicle to provide access to the underside of the vehicle.

2. Description of the Prior Art

Many aspects of servicing and maintaining a vehicle require access to the underside of the vehicle. The simple task of changing the vehicle's oil, for example, can become nearly impossible unless the mechanic can place himself beneath the vehicle with sufficient room to work.

Many different tools and devices are known that can be used to elevate one or both ends of a vehicle. However, many of these tools and devices suffer from one or more shortcomings. The common jack, while portable and accessible to the do-it-yourself mechanic, is limited in application and safety due to its narrow base. Typically, jacks are capable of elevating only one end of a vehicle and may be limited to raising just one side of one end of a vehicle. If a single jack is disposed at one end of a vehicle along its centerline, the vehicle will be susceptible to tipping and falling to one side. The use of two jacks to increase stability can be awkward and impractical.

Mechanical and hydraulic lifts provide sufficient power and stability to safely lift an entire vehicle off the ground. U.S. Pat. Nos. 5,340,082; 5,297,653; 4,901,980; and Des. No. 349,802 all teach different forms of vehicle lifts. Many similar lifts can raise a vehicle to a height that allows a mechanic to comfortably walk beneath the vehicle and work on its underside. However, these lifts are typically expensive and require a large amount of floor space. Moreover, lifts are usually built into the floor of the garage and are incapable of being moved from one end of the garage to another. Accordingly, lifts are usually not practical for smaller garages or the do-it-yourself mechanic.

Ramps often provide a middle ground between simple jacks and complex lifts. Fixed ramps can be easily fashioned from a pair of rails that are positioned several feet above the floor of the garage, with a sloped platform or a pair of tracks leading to a generally horizontal platform which supports one end of a vehicle. This design allows the mechanic to safely lay beneath the vehicle and work on its underside. The convenience of being able to selectively position the ramp, or easily remove it from the garage entirely, prompted the design of wheeled ramps. However, such a design requires that the ramp be of sufficient strength to support the weight of a vehicle while remaining relatively light and easy to maneuver. Moreover, wheeled ramps must be designed so that once the ramp is placed in position, the wheels can be easily disengaged from the floor so that the ramp is adequately anchored for use in elevating a vehicle.

U.S. Pat. No. 5,447,406 teaches a wheeled ramp that is selectively positionable and sufficiently mobile to allow a mechanic to move the ramp to a convenient storage location when it is not in use. However, its design requires a complexity of lever-arms that must be hand-operated by the mechanic to engage and disengage the wheels in order to position and secure the ramp. The complexity of the lever-arm system is naturally prone to mechanical failure and human error. The manufacture of such a wheeled ramp also requires precise tooling and construction to provide continued effective use.

Accordingly, there is a need for an improved wheeled ramp for elevating vehicles with a simple design that allows for ease of operation and manufacture.

SUMMARY OF THE INVENTION

The present invention relates to wheeled ramps for elevating and servicing a plurality of different types of vehicles. More particularly, the device of the present invention relates to a simplified structure for wheeled ramps for vehicles that provides ease of use and manufacture without sacrificing safety and dependability.

The base of the ramp is comprised of horizontally disposed base plates that are in spaced relation to each other, forming a gap therebetween. A sloped platform extends upwardly from the base to a point above the gap between the base plates. A generally horizontal platform is connected to the elevated end of the sloped platform and extends outwardly over the base. A plurality of paired, vertically disposed supports extend upwardly from the base and are connected to the sloped and horizontal platforms.

The ramp is provided with a pair of retractable wheels that allow the ramp to be selectively mobile. The wheels are easily retracted into the base so that the ramp is secured against the floor of the garage when the ramp is in use. A spring, disposed between the wheels and the horizontal platform, extends when the vehicle is wheeled off the ramp. This action brings the wheels into functional engagement with the floor of the garage, permitting the ramp to once again be moved. An elongated, retractable handle is provided at one end of the ramp to allow the mechanic to reposition the ramp.

It is therefore an object of the invention to provide an improved ramp for elevating vehicles that is easy to use.

A further object of the invention is to provide an improved ramp for elevating vehicles that is easy to manufacture.

A further object of the invention is to provide an improved ramp for elevating vehicles that is selectively mobile.

A further object of the invention is to provide an improved mobile ramp for elevating vehicles that is stable and durable.

A further object of the invention is to provide a ramp for elevating vehicles having retractable wheels that allow the ramp to be safely secured to the ground when the ramp is in use, and easily moved when it is no longer in use.

A further object of the invention is to provide a ramp for elevating vehicles having wheels that retract automatically when a vehicle is wheeled onto the ramp, and extend automatically when the vehicle is wheeled off of the ramp.

These and other objects of the present invention will be apparent to those skilled in the art.

DESCRIPTION OF THE PREFERRED EMBODIMENT

Figure 1:
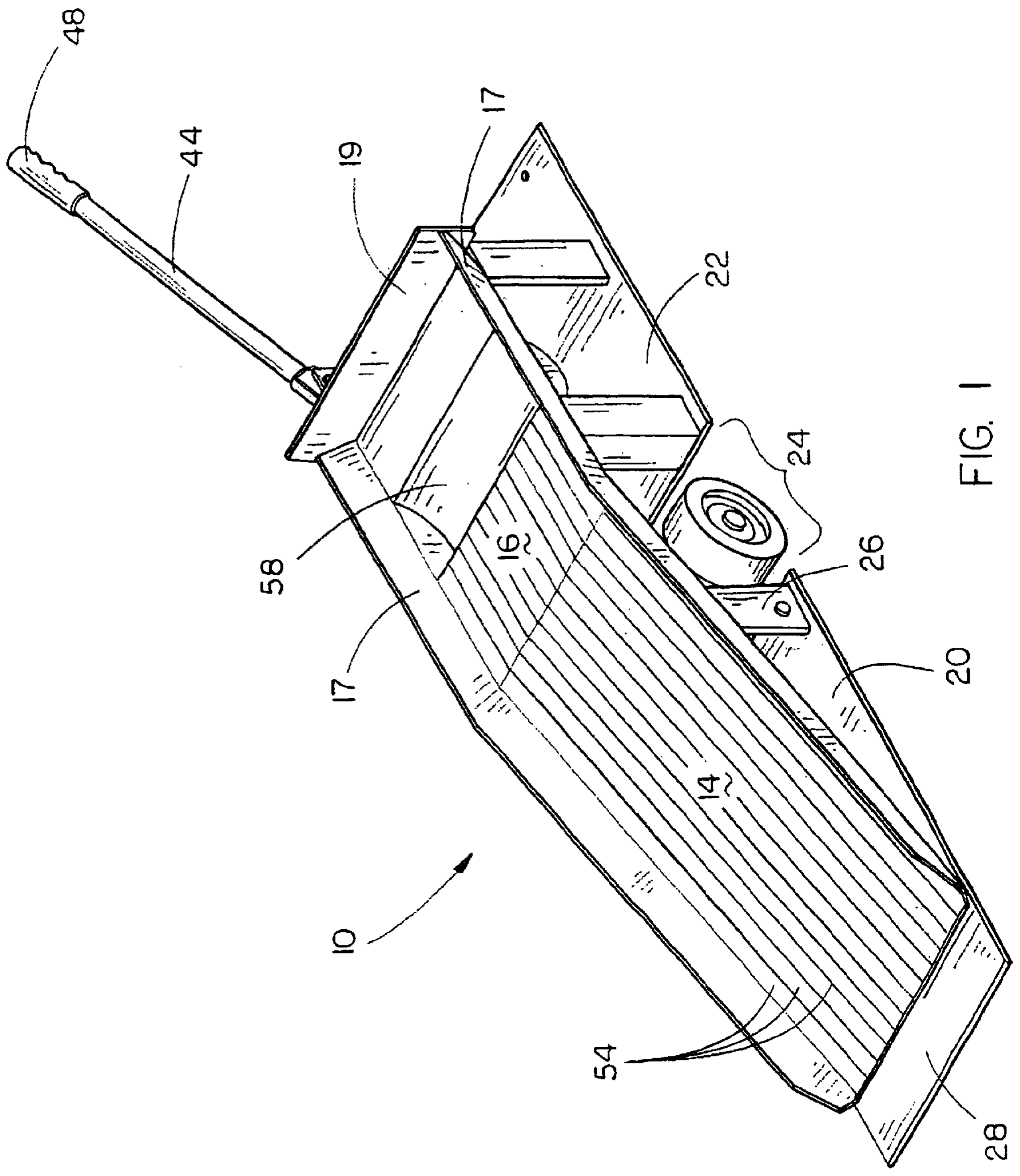
FIG. 1 is a perspective view of the present invention.

The numeral 10 refers generally to the ramp of the present invention. It should be understood that the present invention is well-suited for elevating most types of vehicles including, but not limited to, cars, trucks, motor homes, buses, and trailers. However, for simplicity of description, the present invention will be described as it is used to elevate "vehicles".

As shown in FIGS. 1–4, the ramp 10 is comprised of an upper deck 12, having a sloped platform 14, a generally horizontal platform 16, and a base 18. Side retention plates 17 and end plate 19 are provided to help prevent the wheels of a vehicle from leaving upper deck 12. In its preferred embodiment, the base 18 is comprised of at least two base plates 20 and 22 arranged in spaced relation with one another to form a gap 24 therebetween. It is contemplated, however, that the base 18 could be formed from a single base plate or an infinite number of smaller base plates. A plurality of paired, horizontally spaced and vertically disposed supports 26 are secured to the base 18 and support the upper deck 12 so that the upper deck 12 is positioned directly above base 18 and spaced therefrom by a particular distance. It is contemplated that a single support 26 could be constructed to adequately support upper deck 12 over base 18, however, it is preferred that a plurality of paired supports 26 be used. It is further contemplated that the sides of base 18 could be extended in a substantially vertical direction to connect the same to the upper deck 12 (not shown), thus supporting the upper deck 12 above the base 18 without the use of paired, horizontally spaced supports 26. In any of the aforementioned embodiments, it is contemplated that in the construction of ramp 10, the distance that upper deck 12 and base 18 are spaced from one another can be varied according to a particular intended use for ramp 10.

Figure 4:
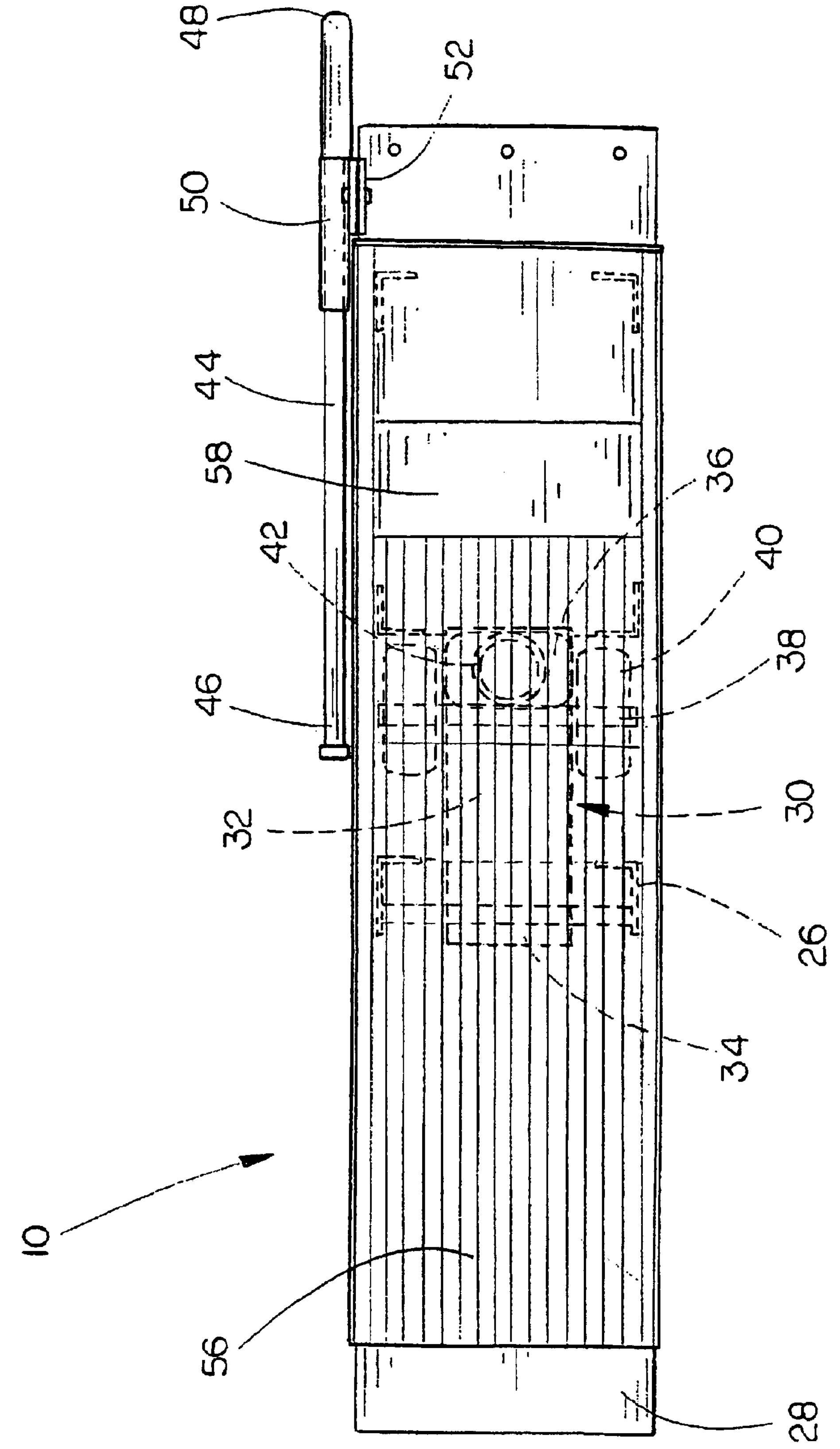
FIG. 4 is a top view of the present invention.

As shown in FIGS. 1 and 4, base plate 20 extends beyond the lower edge of sloped platform 14 and inward under the upper deck 12 to a first pair of vertical supports 26 and gap 24. It is preferred that base plate 20 extend a significant distance beyond the lower edge of sloped platform 14 to form a tab 28, as shown in FIG. 1. Tab 28 provides a surface for the wheels of the vehicle to roll onto, thus securing ramp 10 to the ground while the vehicle ascends sloped platform 14, and preventing the vehicle from pushing the ramp 10 out of position. It is also contemplated that tab 28 could be formed from an article separate from but secured to base plate 20 or sloped platform 14. This separate article could be made from a flexible material such as a rubber mat or a rigid plate similar to those used to construct upper deck 12 and base 18. The separate article could be connected to the base plate 20 or sloped platform 14 in a fixed position or in a hinged manner, which would allow for storage of tab 28.

Figure 2:
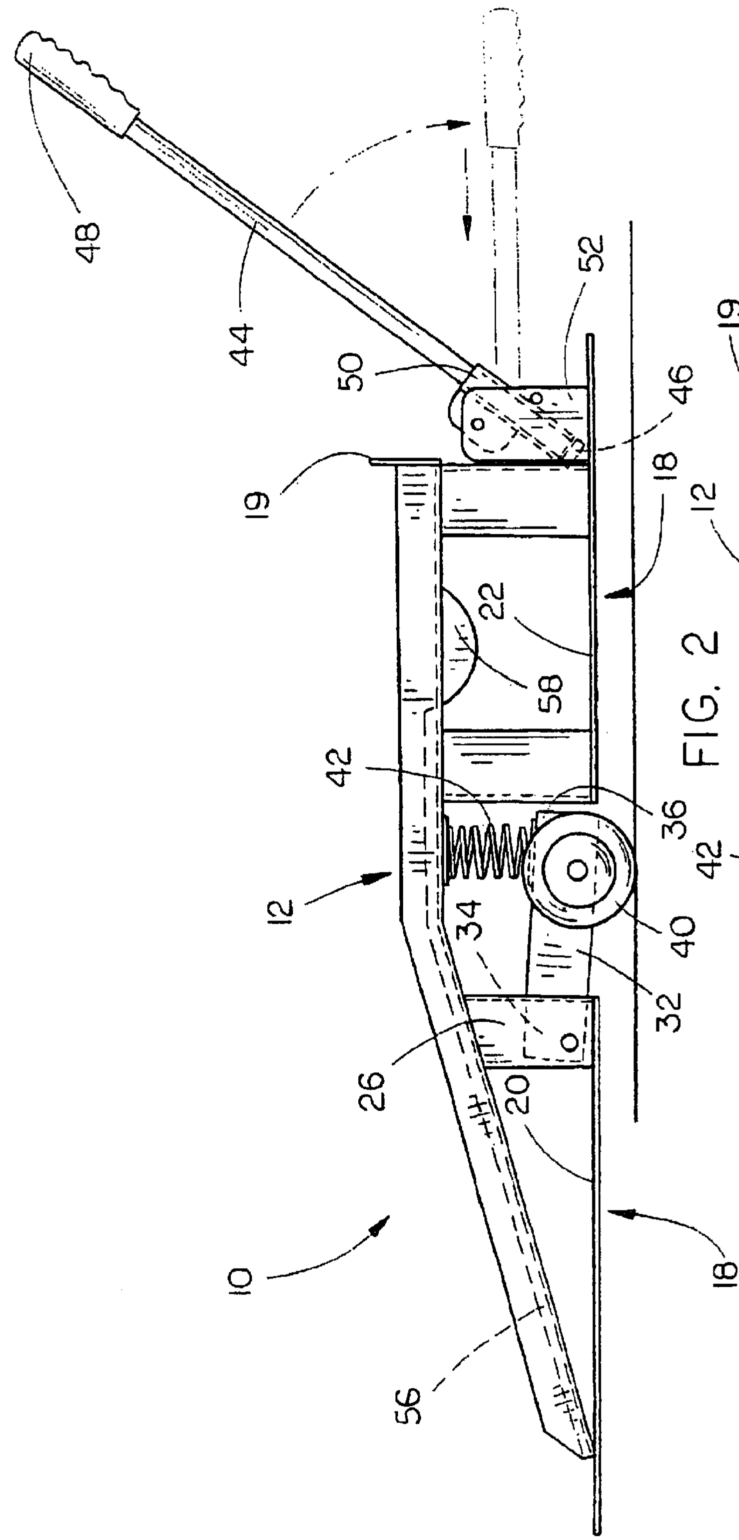
FIG. 2 is a side view of the present invention in its mobile position with its wheels and positioning handle extended.
Figure 3:
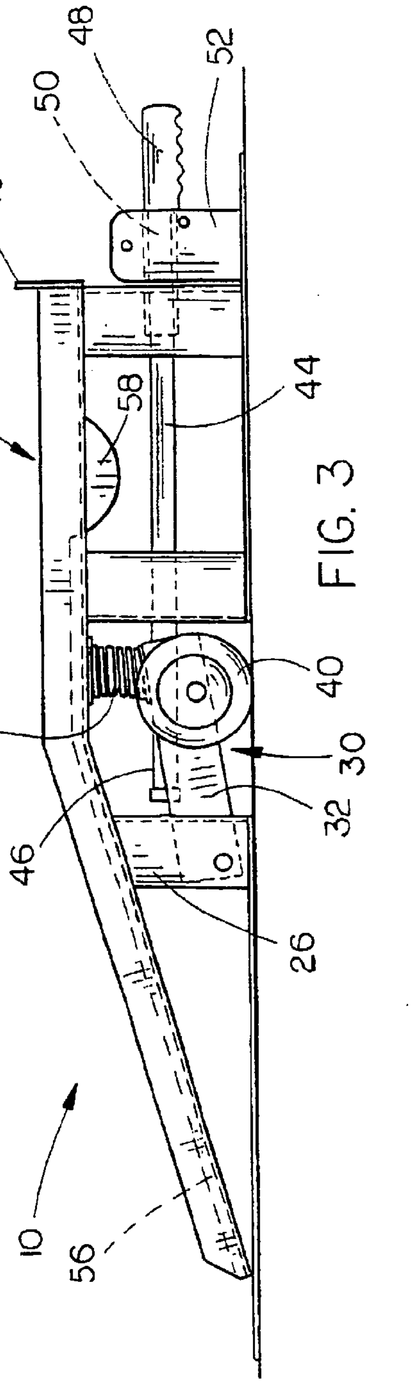
FIG. 3 is a side view of the present invention in secured engagement with the ground with its wheels and positioning handle retracted.

Ramp 10 is further provided with a retractable wheel assembly 30 so that ramp 10 can be easily moved from one location to another. As shown in FIGS. 2–4, wheel assembly 30 is comprised of an elongated tongue 32, having a first end 34 and second end 36, which is pivotally connected at its first end 34 to the first pair of vertical supports 26. An axle 38 is rotatably mounted within the second end 36 of tongue 32. A pair of wheels 40 are disposed at either end of axle 38. Tongue 32 extends above base 18 a sufficient distance to allow the wheels 40 to be positioned within gap 24, as shown in FIGS. 1–3. A spring 42 is secured to the upper surface of tongue 32, closely adjacent the second end 36 thereof. Spring 42 operatively engages the lower surface of upper deck 12 with sufficient force to push the second end 36 of tongue 32 in a downward direction, extending wheels 40 through gap 24. In this position, the entire weight of ramp 10 can be supported by wheel assembly 30 so that ramp 10 can be moved from one location to another, rolling along wheels 40 as shown in FIG. 2.

When ramp 10 is not in use, the wheels 40 extend through gap 24. When a vehicle is wheeled onto the ramp 10, the weight of the vehicle overcomes the spring force of spring 42. This force compresses spring 42 and raises the second end 36 of tongue 32 with respect to the ramp 10, thus retracting wheels 40 into the ramp 10, as shown in FIG. 3. With the wheels retracted, base 18 is firmly secured to the floor. When the vehicle is wheeled off the ramp 10, the spring 42 decompresses and the wheels 40 are again extended through gap 24, enabling the ramp 10 to be easily moved from one location to another.

Figures 5, 6:
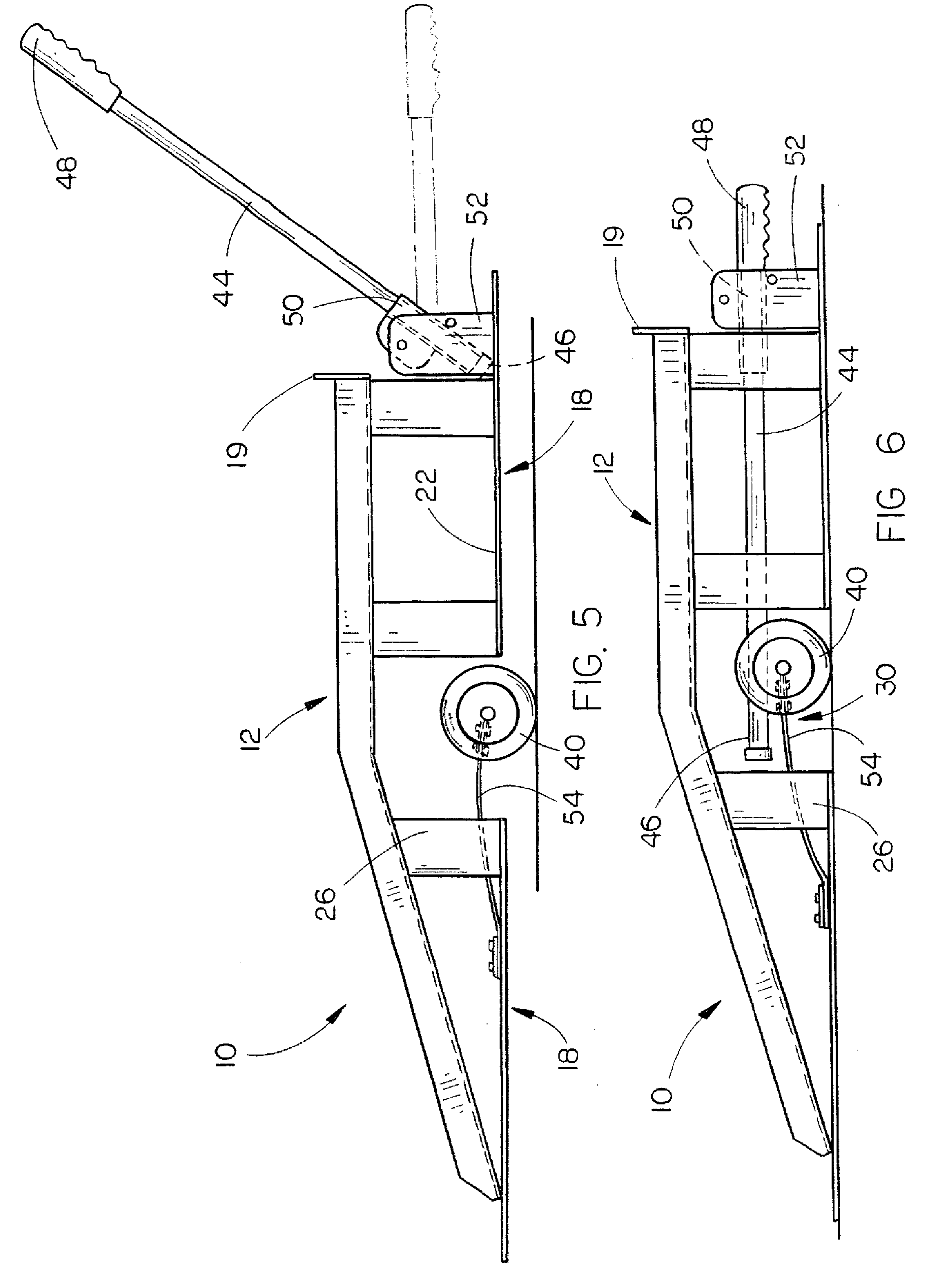
FIG. 5 is a side view of the present invention, with an alternate wheel assembly, in its mobile position.
FIG. 6 is a side view of the present invention, with an alternate wheel assembly, in its secured position.

In an alternative embodiment (shown in FIGS. 5 and 6), wheel assembly 30 is comprised of an elongated leaf spring 54, having first and second ends. The first end of leaf spring 54 is adapted with a bracket or other suitable means so that the first end can be secured to the base 18. It is contemplated, however, that the first end of leaf spring 54 could be secured to a vertical support 26 or upper deck 12. The second end of leaf spring 54 is adapted with a bracket or other suitable means for rotatably securing axle 38 thereto. It is further contemplated that the first and second ends of leaf spring 54 could be secured to the ramp adjacent both sides of gap 24 with axle 38 being disposed intermediate the first and second ends (not shown). Regardless, leaf spring 54 enables the wheel assembly to be mechanically responsive to the weight of a vehicle being received by ramp 10 as described above.

In another embodiment, it is contemplated that base 18 could be provided without a gap 24 therein. Without a gap 24, it is necessary to extend the length of axle 38 such that the wheels 40 extend beyond the sides of base 18 so that they may be selectively engaged with the floor. Accordingly, when the wheel assembly is in the extended position, axle 38 is positioned closely adjacent the base 18 and the ramp 10 may be wheeled into position. When the wheel assembly is in the retracted position, axle 38 is positioned away from base 18, thus allowing wheels 40 to retract and base 18 to engage the floor.

To assist in moving the ramp 10 while it is being supported by wheel assembly 30, the ramp 10 is provided with a retractable handle 44, having a first end 46 and second end 48. Handle 44 is slidably secured to a collar 50, which is pivotably secured to bracket 52. In its stored position, handle 44 is secured along one side of ramp 10, between the upper deck 12 and the base 18, with its second end 48 closely adjacent collar 50. In use, the handle 44 is first slid through collar 50 until the first end 46 of handle 44 is closely adjacent collar 50. The second end 48 is then lifted, pivoting handle 44 and collar 50 upwardly and arcably to a desired height for the user. In this position, handle 44 can be used to pull or push ramp 10 to a desired location. For the user's comfort and grip stability, the second end 48 can be adapted with a layer of flexible and resilient material, such as rubber, Neoprene, or other available natural or synthetic materials. It is also contemplated that the grip could be made of durable, non-flexible materials such as metal or hardened plastic.

Water, oil, and other fluids are commonly spilled when servicing a vehicle. Accordingly, it is contemplated that the upper deck 12 could be provided with grooves or channels 54 disposed therein to direct the fluids away from the surface of the upper deck, thus maintaining a reasonable degree of traction between the wheels of the vehicle and the surface of upper deck 12. It is also contemplated that a mat of a water-resistant material 56, having dimensions sufficient to cover the upper surface of upper deck 12, could be provided with similar grooves or channels for directing fluids away from the upper deck 12. In the preferred embodiment, the mat 56 is at least used as a traction pad that is adhered to the lower surface of base 18 to allow fluids to pass between the base 18 and the floor, thus improving the coefficient of friction between the ramp 10 and the floor. Adhering the mat 56 to the lower surface of base 18 further protects the surface of the floor from marks that could be caused by the base 18 during normal use of the ramp 10. It is further contemplated that the upper deck 12 could comprise at least one depression 58 formed thereon, the depression 58 being adapted to receive at least one wheel to prevent longitudinal movement of the vehicle's wheels beyond the second end of the upper deck.

In the drawings and in the specification, there has been set forth preferred embodiments of the invention and although specific items are employed, these are used in a generic and descriptive sense only and not for purposes of limitation. Changes in the form and proportion of parts, as well as a substitution of equivalents, are contemplated as circumstances may suggest or render expedient without departing from the spirit or scope of the invention as further defined in the following claims.

Thus it can be seen that the invention accomplishes at least all of its stated objectives.

We claim:

1. A ramp for at least partially elevating a wheeled vehicle, comprising:

a generally planar upper deck having a sloped platform and a generally horizontal platform;

a generally planar horizontally disposed base, having first and second ends;

at least one elongated support operatively connecting said base to said upper deck; and a wheel assembly, comprising at least a generally elongated lever having first and second end portions, a generally helically-shaped spring, an axle, and at least one wheel; said first end portion of said lever being operatively pivotably connected to said at least one elongated support said axle being operatively rotatably secured to said lever proximal the second end portion thereof; said spring being operatively coupled to said lever and said upper deck;

said wheel assembly being adapted to extend and retract said at least one wheel with respect to said base;

said wheel assembly being positioned with respect to said upper deck and said base to retract in a substantially upward direction to a position generally intermediate said upper deck and said base in response to said vehicle being at least partially wheeled onto the sloped platform of said upper deck.

2. The ramp of claim 1 wherein said wheel assembly is further adapted to extend in a generally downward direction, so that said at least one wheel is positioned at least partially below said base, in response to the vehicle being wheeled substantially off of said upper deck.

3. The ramp of claim 1 wherein at least one opening is disposed through said base between said first and second ends.

4. The ramp of claim 3 wherein said wheel assembly is adapted to extend at least partially through the at least one opening disposed between the first and second ends of said base in response to the vehicle being wheeled substantially off of said upper deck.

5. The ramp of claim 1 wherein said base is comprised of at least one substantially planar and horizontally disposed base plate.

6. The ramp of claim 1 wherein said base extends outwardly from the first end of said upper deck to form a generally elongated planar tab; said tab being adapted to receive said at least one wheel of said vehicle thereon so that the position of the ramp is secured while the vehicle is at least partially wheeled onto said upper deck.

7. The ramp of claim 1 further comprising a generally elongated handle, said handle being adapted to selectively move and position the ramp.

8. The ramp of claim 7 wherein said handle is operatively connected to the ramp so that said handle is selectively positioned between retracted and extended positions.

9. The ramp of claim 7 wherein said handle comprises first and second ends and a grip disposed closely adjacent the second end of said handle.

10. The ramp of claim 9 wherein said grip is comprised of a flexible material.

11. The ramp of claim 1 wherein said upper deck comprises a plurality of channels therein for directing fluid away from said upper deck.

12. The ramp of claim 1 further comprising a generally elongated and planar mat comprised of a flexible and resilient material.

13. The ramp of claim 12 wherein said mat is operatively connected to said upper deck so that said mat is disposed between said vehicle and said upper deck.

14. The ramp of claim 13 wherein said mat is operatively connected to said base.

15. The ramp of claim 1 wherein said upper deck further comprises first and second ends and at least one generally elongated end plate operatively connected to the ramp closely adjacent the second end of said upper deck; said at least one end plate being adapted to prevent longitudinal movement of the vehicle's wheels beyond the second end of said upper deck.

16. The ramp of claim 1 wherein said upper deck further comprises first and second ends and at least one depression formed therein closely adjacent the second end thereof; said at least one depression being adapted to receive said at least one wheel to prevent longitudinal movement of the vehicle's wheels beyond the second end of said upper deck.

17. The ramp of claim 1 wherein said upper deck further comprises first and second sides and at least one generally elongated side plate; said at least one side plate being operatively connected to the upper deck to prevent transverse movement of the vehicle's wheels beyond at least one of said first and second sides of said upper deck.

* * * * *